United States Patent
Sugiyama et al.

(10) Patent No.: US 6,414,270 B1
(45) Date of Patent: Jul. 2, 2002

(54) HEATER, HEATER-EQUIPPED STEERING WHEEL, AND METHOD OF MANUFACTURING SUCH STEERING WHEEL

(75) Inventors: Toshiyuki Sugiyama; Mikio Ochiai; Nobukazu Akaike; Hiromitsu Harada, all of Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/956,077

(22) Filed: Sep. 20, 2001

(30) Foreign Application Priority Data

Sep. 21, 2000 (JP) .................................... 2000-287360
Sep. 22, 2000 (JP) .................................... 2000-289200
Sep. 29, 2000 (JP) .................................... 2000-301025

(51) Int. Cl.$^7$ ................................................. H05B 3/00
(52) U.S. Cl. ...................... 219/204; 219/529; 219/545; 219/549; 74/552
(58) Field of Search ................................ 219/204, 528, 219/548, 202, 535, 529, 545, 549, 206, 207, 212, 209; 74/552, 557, 558

(56) References Cited

U.S. PATENT DOCUMENTS

| | | | | | |
|---|---|---|---|---|---|
| 4,547,655 A | * | 10/1985 | Kurata et al. | ................ | 219/204 |
| 5,294,775 A | * | 3/1994 | Carrier | ................ | 219/204 |
| 5,605,643 A | * | 2/1997 | Reece | ................ | 219/204 |
| 5,847,360 A | * | 12/1998 | Lorenzen et al. | ............ | 219/204 |
| 5,850,741 A | * | 12/1998 | Feher | ................ | 62/3.61 |
| 6,172,342 B1 | * | 1/2001 | Khafagy et al. | ............. | 219/204 |
| 6,268,588 B1 | * | 7/2001 | Hazebrouck et al. | ....... | 219/204 |
| 6,299,466 B1 | * | 10/2001 | Bolen et al. | ................ | 439/164 |

FOREIGN PATENT DOCUMENTS

| | | |
|---|---|---|
| JP | 63-11029 | 4/1988 |
| JP | 4-15162 | 1/1992 |

* cited by examiner

*Primary Examiner*—Teresa Walberg
*Assistant Examiner*—Shawntina T. Fuqua
(74) *Attorney, Agent, or Firm*—Foley & Lardner

(57) ABSTRACT

A heater for a steering wheel includes a heater main body arranged on a rim of the steering wheel and formed like a net. The heater main body comprises a plurality of heater wires for generating heat upon energization and side edges arranged along longitudinal edges of the heater main body and fixed at an inner periphery of the rim.

17 Claims, 9 Drawing Sheets

HEATER, HEATER-EQUIPPED STEERING WHEEL, AND METHOD OF MANUFACTURING SUCH STEERING WHEEL

BACKGROUND OF THE INVENTION

The present invention relates to heaters for heating steering wheels for vehicles, heater-equipped steering wheels, and a method of manufacturing such steering wheels.

When using the steering wheels for vehicles in cold conditions such as the outdoors in winter, it is desirable for comfortable steering after vehicle start to quickly heat a steering-wheel rim up to a temperature suitable for driver's holding operation.

One solution is to heat the steering-wheel rim by means of engine coolant or hot air out of an air-conditioning box. However, for cooled vehicles in cold conditions such as the outdoors in winter, this solution needs sufficient warming-up of the vehicles, leading to difficulty of quick heating of the rim.

Another solution is to arrange in a grip portion of the steering wheel a sheet-like heater to which engine-generated power is supplied.

JP-Y2 63-11029 discloses a heater-equipped steering wheel comprising a steering-wheel main body having a heat insulator at the outer periphery, a sheet-like heating unit placed on the heat insulator, and a covering placed on the heating unit. The heating unit comprises a covered heater wire having a core string and a heating wire wound thereon, which is disposed zigzag and close on the inner surface of a heat-equalizing aluminum foil. However, the zigzag arrangement of the heater wires on the foil needs complicated operation when visually excellently mounting the heating unit along the rim of the annular steering wheel having circular section, leading to difficult enhancement in workability. In other words, the provision of finished products having excellent appearance involves an increase in manufacturing cost. Moreover, the zigzag arrangement often creates protrusion of thick heater wires on the covering, i.e. so-called outstanding state thereof, which can be perceived visually and tactilely, resulting in difficult enhancement in visual quality and operation feel of the steering wheel.

JP-A 4-15162 discloses a heatable steering wheel including a net heating insert obtained by weaving a plurality of thin heating wires. The heating insert is connected to a covering material by means of joining or other appropriate means, which is mounted to a steering-wheel main body. This allows deformation of a heater in response to the curved surface of the steering-wheel rim in securing the amount of generated heat per unit area. This structure is preferable in view of difficulty of creating the so-called outstanding state of the heater wires. However, mounting the band-like net heater along the surface of the rim is not easy operation exactly. Moreover, preforming the net heater to conform to the shape of the rim involves an increase in manufacturing cost and a decrease in general versatility. Furthermore, as is not apparent from the disclosure of JP-A 4-15162, when fixing the net heater by full application of an adhesive, stress acts concentratedly on fixed areas to bring easy breaking of the heater wire. And when having relatively small number of heater wires, breaking of some heater wires can lower the heater capacity, so that prudent assembling is needed not to damage the heater wires, causing lowering of the workability and yield or necessity of careful inspection, leading to difficult reduction in manufacturing cost. Particularly, feed portions located at both ends of the heater wherein an expandable net heating portion and feeders are connect to terminal plates can concentratedly undergo tensile stress during assembling, forming a cause of breaking of the heater wires which can degrade the temperature rise-characteristics.

As described above, the zigzag arrangement of the heater wires as disclosed in JP-Y2 63-11029 often creates the outstanding state of the heater wires on the covering, making difficult the enhancement in visual quality and operation feel of the steering wheel. On the other hand, the use of a net heating insert obtained by weaving thin heating wires as disclosed in JP-A 4-15162 requires complicated operation of accurately positioning a heater, making difficult a reduction in manufacturing cost. Moreover, prudent assembling is needed not to damage the heater wires, making manufacturing complicated, leading to difficult reduction in manufacturing cost.

SUMMARY OF THE INVENTION

It is, therefore, an object of the present invention to provide heaters for heating steering wheels for vehicles, which ensure excellent temperature-rise characteristics and easy assembling with reduced manufacturing cost. Another object of the present invention is to provide steering wheels equipped with heater of the present invention. Still another object of the present invention is to provide a method of manufacturing such steering wheels.

The present invention provides generally a heater for a steering wheel, comprising:
  a main body arranged on a rim of the steering wheel, the main body being formed like a net comprising a plurality of heater wires for generating heat upon energization; and
  side edges arranged along longitudinal edges of the main body, the side edges being fixed at an inner periphery of the rim.

One aspect of the present invention is to provide a steering wheel, comprising:
  a steering-wheel main body with a rim;
  a heater arranged on the rim; and
  a covering arranged on the heater,
  wherein the heater comprises a heater main body formed like a net comprising a plurality of heater wires for generating heat upon energization, and side edges arranged along longitudinal edges of the heater main body and fixed to the covering at an inner periphery of the rim.

Another aspect of the present invention is to provide a method of manufacturing a heater equipped steering wheel, comprising:
  placing a heater on a covering of the steering wheel at an inner periphery and along longitudinal edges of the covering to form a tube-like member;
  engaging the tube-like member with a rim of the steering wheel at an outer periphery of the rim; and
  connecting longitudinal edges of the tube-like member along the inner periphery of the rim.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a description will be made with regard to a heater for heating a steering wheel for a vehicle, a heater-equipped steering wheel, and a method of manufacturing such steering wheel, which embody the present invention.

Figure 1:
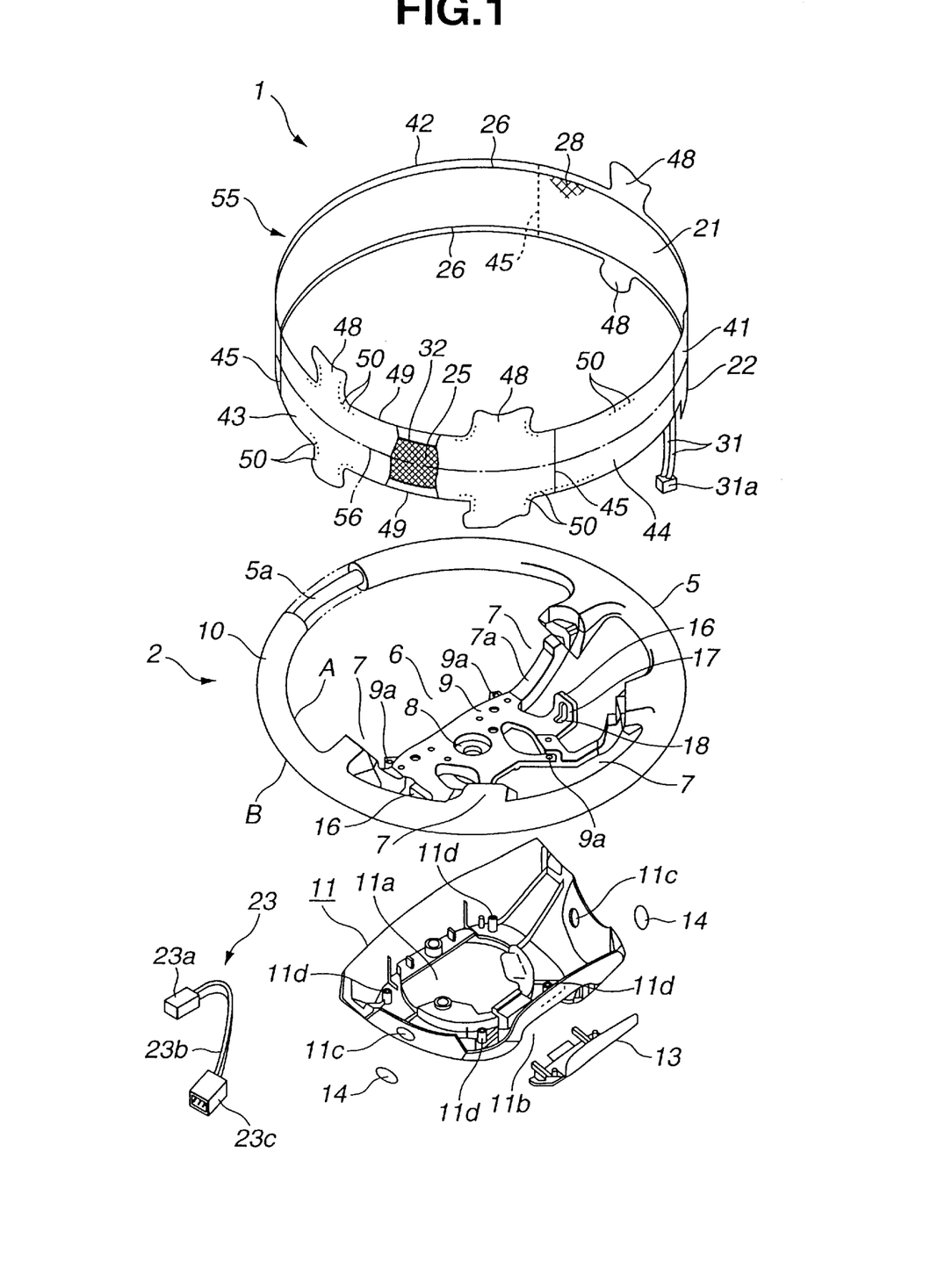
FIG. 1 is a partially cutaway exploded perspective view showing a steering wheel embodying the present invention.
Figure 2:
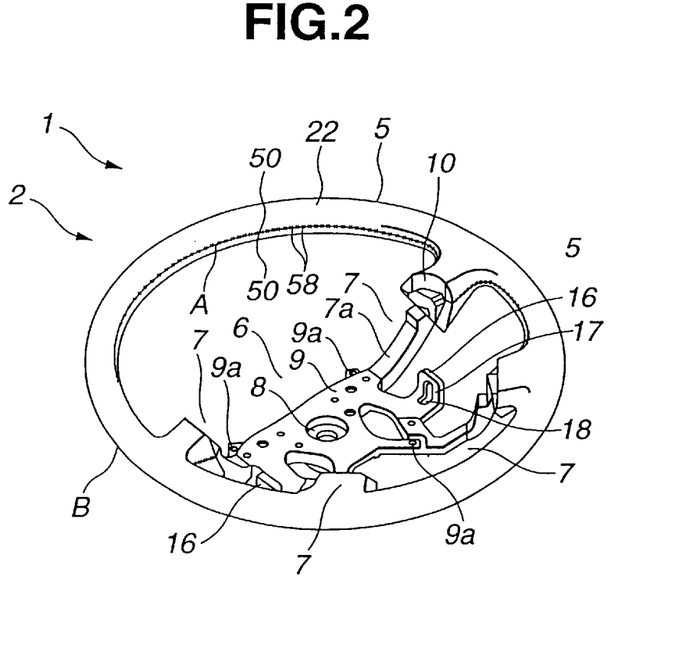
FIG. 2 is a perspective view showing a steering-wheel main body with a heater and a skin mounted.

Referring to FIGS. 1–2, a steering wheel 1 for a vehicle comprises a steering-wheel main body 1 and an airbag device or module or a pad, not shown, mounted thereto on the side of a driver or occupant. The steering wheel 1 is mounted to a steering shaft that is ordinarily provided with the vehicle in an inclined way. For the steering wheel 1, refer hereafter the occupant or front side of the airbag device to as upper side, the steering-shaft or reverse side to as lower side, the vehicular forward or front-glass side to as front side, and the vehicular backward or lower rearward side to as rear side.

The steering-wheel main body 2 comprises an annular rim 5 called also grip or ring for holding operation, a boss 6 placed inside the rim 5, and a plurality of (four in the embodiment) spokes 7 for connecting the rim 5 and the boss 6. Arranged in the lower part or on the vehicle-body side of the boss 6 is a substantially cylindrical boss portion 8, to which a boss plate or hub core 9 is integrally fixed by means of die casting of aluminum alloy, etc. A core bar 7a of each spoke 7 is integrated with or fixed to the boss plate 9 by welding or the like to extend therefrom. A core bar 5a of the rim 5 is fixed to the core bars 7a of the spokes 7 by welding or the like. An inner covering 10 of soft polyurethane foam or the like is arranged on all circumferential surface of the core bar 5a of the rim 5 and the surface of a rim-side end of each core bar 7a of the spoke 7. Refer hereafter the side of the rim 5 circumferentially facing the boss 6 to as inner periphery A, and the side opposite to the inner periphery A to as outer periphery B.

A resin lower cover 11 called also rear cover or body cover is attached to the boss 6 of the steering wheel 1 to conceal the underside of the boss 6. The lower cover 11 has a center opening 11a formed vertically therethrough, a rear opening 11b that opens to the rear side, and substantially circular side openings 11c that open to both sides. The steering shaft is arranged through the center opening 11a, and an electric connection device such as clock spring, not shown, is disposed therein to electrically connect a vehicle body and the steering wheel 1. The rear opening 11b and the side openings 11 serve as work openings. The rear opening 11b is concealed with a detachable cover or lid 13, and each side opening 11c is concealed with a detachable cover or mask 14. A plurality of (four in the embodiment) mounting bosses 11d with tapped hole is formed with the lower cover 11, wherein a screw is engaged with the mounting boss lid through a lower-cover mounting hole 9a of the boss plate 9 from above, mounting the lower cover 11 to the boss plate 9.

Mounting lugs 16 are arranged on both sides of the boss plate 9 for integration therewith. Each mounting lug 16 includes a bracket 17 obtained by extending outwardly horizontally and then being bent upwardly in a slightly outwardly inclined way, and a bracket slot 18 formed in the transverse center of the bracket 17 to extend longitudinally.

The airbag device, not shown, has a horn-switch mechanism or switch device integrally arranged therein, through which an airbag-device main body is supported. The airbag-device main body comprises a base plate formed out of a metal plate or the like, an airbag, a resin cover for concealing the folded airbag, an inflator for ejecting gas, a retainer for fixing the airbag and the inflator to the base plate, and a tube-like metal belt for fixing the cover to the base plate. On the other hand, the horn-switch mechanism comprises a horn plate or support, a pair of switches, four horn springs or coil spring or biasing means, three TORX bolts or coupling means, and a pair of harnesses. The horn-switch mechanism is mounted to the mounting lugs 16 of the boss plate 9. The push of the airbag device makes contacts of the horn switches contact with each other to sound a horn. In the event of vehicle collision or the like, the inflator quickly jets gas into the folded airbag, which expands instantaneously to rip and open the cover, obtaining the airbag deployed in front of an occupant and the horn plate deformed plastically for occupant restraint.

A heater 21 is arranged on the surface of an inner covering 10 of the rim 5 of the steering-wheel main body 2, and a skin or covering member 22 is arranged on the surface of the heater 21.

Referring to FIG. 1, the heater 21 comprises a heater main body 25 forming a long band-like net and having a long rectangular shape as a whole. The heater main body 25 has longitudinal edges that form side edges 26, and longitudinal ends that form terminals 27a, 27b. The heater main body 25 is obtained by weaving a plurality of heater wires 28 like a net, wherein each heater wire 28 comprises a core wire generating heat during energization and having an insulating film on the surface. Specifically, referring to FIG. 4 wherein one heater wire 28 is shown by thick line for explanation, each heater wire 28 except heater wires located at a transverse end is moved rectilinearly by two squares, and hooked to another heater wire 28 for turning-back. Then, it is moved in the opposite direction by one square, and hooked to still another heater wire 28 to be bent roughly at right angles. It is again moved rectilinearly by two squares to draw a zigzag pattern, obtaining a weave extending from one terminal 27a to another terminal 27b.

Figure 3:
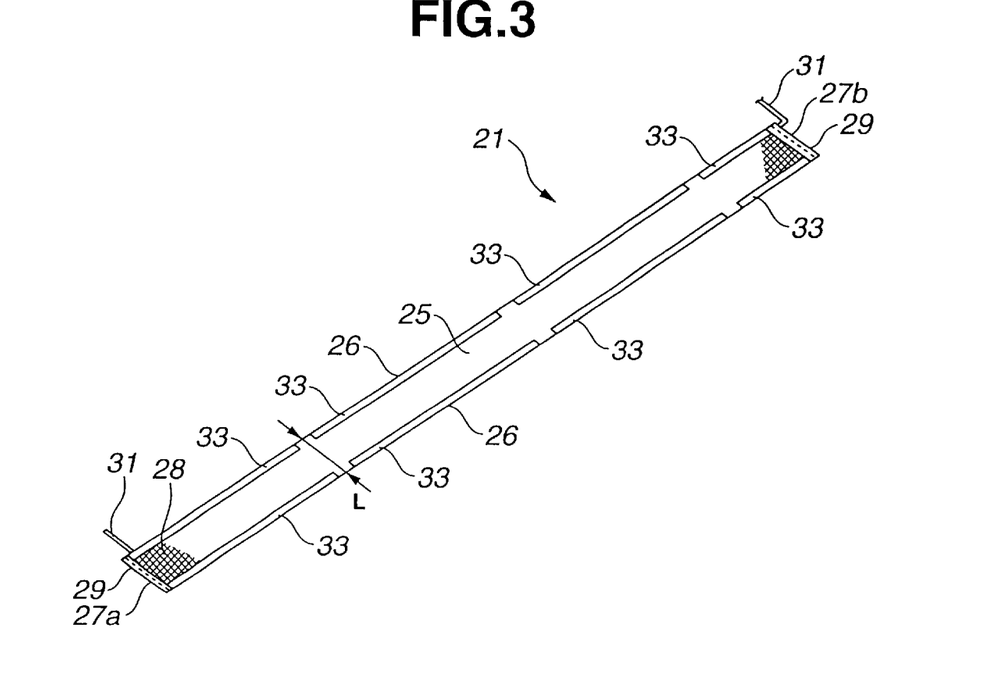
FIG. 3 is a view showing the heater.

As best seen in FIG. 3, attached to each terminal: 27a, 27b of the heater main body 25 is a terminal plate 29 of a copper sheet to which the core wires of the heater wires 28 are connected in parallel to constitute a heater with a predetermined capacity. Preferably, typical heaters for steering wheels have 60–100 W capacity. One lead wire 31 is connected to each terminal 27a, 27b, and has a connector 31a mounted at a tip thereof.

Figure 4:
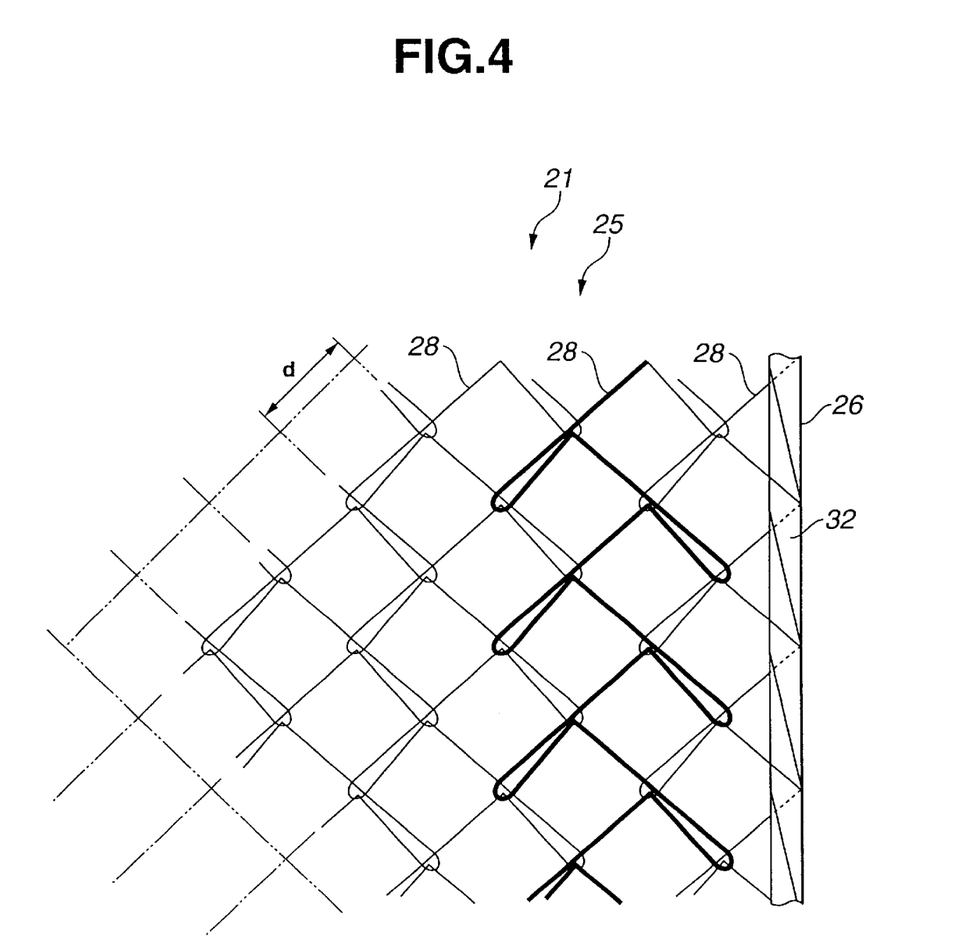
FIG. 4 is an enlarged fragmentary view showing part of the heater.

As best seen in FIG. 4, a string 32 of polyester, nylon or the like is arranged along each side edge 26 to extend longitudinally. The heater wire 28 located at the transverse end is hooked thereto for support. As shown in FIG. 3, a double-faced tape or fixing and joining means 32 is placed at each side edge 26 to adherer to one side, i.e. the skin 22. The string 32 includes two white twines, and is smaller in elongation and greater in tensile strength than the heater main body 25.

Figure 5:
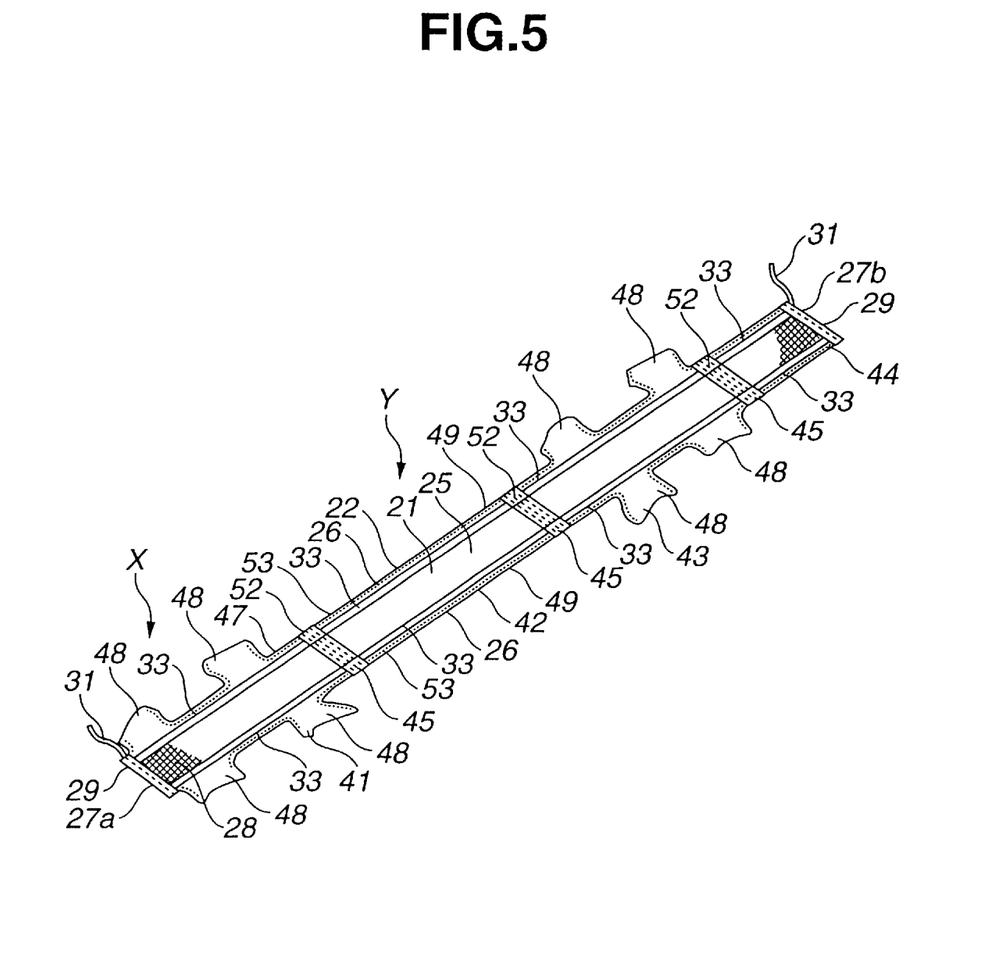
FIG. 5 is a view similar to FIG. 3, showing the skin with heater.

Specifically, referring also to FIG. 5, the heater 21 comprises circumferentially extensible heater main body or heating portion 25, and elongation restraining means or string 32 for restraining elongation of the side edges 26 of the heater main body 25. The heater 21 is of a rectangle with the side edges 26 as long sides, wherein the elongation restraining means 32 are arranged at the opposite side edges 26. The heater main body 25 is formed like a net disposed in the bias direction with respect to the circumferential direction of the rim 5. The rim 5 covered with the heater main body 25 is covered further with the skin 22, to which the side edges 26 of the heater 21 are fixed to particular portions of the skin 22.

In the illustrative embodiment, the heater wire 28 includes, for example, a 0.05–0.10 mm diameter copper nickel alloy wire as core wire, and a polyurethane resin coating as insulting film. A piece of heater wire 28 has 60Ω resistance. As shown in FIG. 4, each heater wire 28 is oven like a net having a rhombic mesh wherein the length d of each side is 2 mm. A width L of the heater 21 is about 70 mm in natural conditions, between which 30 pieces of heater wires 28 are arranged in parallel. The heater 21 operates at 12V, and has 72 W capacity.

As shown in FIG. 5, the skin 22 includes a sheet such as natural or artificial leather. In the illustrative embodiment, the skin 22 is formed like roughly a band as a whole by connecting a plurality of band-like members 41, 42, 43, 44 of natural cowhide to each other through connections 45. The skin 22 comprises a main body 47 for covering the rim 5, and extensions 48 extending from the main body 47 for covering the spokes 7. As best seen in FIG. 1, the skin 22 has stitch holes 50 formed along the vicinity of edges 49 and throughout the length.

The operation of mounting the heater 21 to the steering-wheel main body 21 will be described. Referring to FIG. 5, the heater 21 having double-side tape 33 placed is stuck to the inner surface of the roughly band-like skin 22. Then, double-sided tapes 52 are placed on the inner surface of the heater 21 in the cross direction and along the connections 45 of the skin 22. The double-sided tapes 33, 52 placed on the surface of the heater main body 25 of the heater 21 provide an adhesive effect to both sides of the heater 21 through meshes of the heater main body 25.

Then, both ends of the skin 22 having heater main body 25 stuck are joined by sewing or the like to form an annular tube-like member 55 with the heater 21 located inside as shown in FIG. 1. The tube-like member 55 has inner diameter that is slightly smaller than outer diameter of the rim 5 of the steering-wheel main body 2.

The operation of winding the skin 22 on the rim 5 of the steering-wheel main body 2 will be described. With the skin 22 pulled and stretched for temporarily enlarging the diameter of the tube-like member 55, a transverse center 56 of the skin 22, i.e. the heater 21, as shown by one-dot chain line in FIG. 1 is mounted along the outer periphery B of the rim 5. In this state, the skin 22 is elastically deformed under tension, and is fitted to the vicinity of the outer periphery B of the rim 5 without any wrinkle. During mounting operation, the heater main body 25 of the heater 21 placed on the back or inner surface of the skin 22 is also stretched. However, the heater main body 25 is formed like a net, and is not restrained wholly along the skin 22, but free at at least the outer periphery B, having no concentrated elongation in particular spots, resulting in no occurrence of breaking of the heater wires 28. Specifically, when wound on the rim 5 during mounting operation, the skin 22 and the heater 21 produce dimensional changes due to respective elongation characteristics. Since the heater main body 25 is more extensible than the skin 22, the elongation of the skin 22 does not bring the heater main body 25 to the elongation limit, resulting in no occurrence of breaking of the heater wires 28 during mounting operation.

As shown in FIG. 5, since the heater 21 is smaller in width than the skin 22, the skin 22 has on both sides of the heater 21 blanks 53 on which the heater 21 is not placed. The heater 21 is placed in a roughly transverse center of the skin 22, wherein the holes 50 are aligned in a row in the transverse center of each blank 53, i.e. the blank 53 is divided into two equal parts with respect to the aligned holes 50 as center line. An adhesive may be used in place of one or both of the double-sided tapes 33, 52.

In this state, since no double-sided tape is arranged along the transverse center of the heater 21, i.e. the transverse center of the heater 21 is not placed on the skin 22, the heater main body 24 or net of heater wires 21 is not restrained by the skin 22 in the center of the heater 21, and thus elongates independently of the skin 22 when stretched.

The skin 22 elongated at the outer periphery B of the rim 5 is inclined inwardly to wind the rim 5, and then disposed along the surface of the rim 5 to adhere thereto by means of the double-sided tapes 33, 52 for temporary fixing.

Subsequently, the edges 49 of the skin 22 are butted each other at the inner periphery A of the rim 5, and stitched with a thread 58 of polyester or the like which passes through the stitch holes 50 as shown in FIG. 2.

The lead wires 31 are connected to a harness, not shown, of the steering-wheel main body 2 through the connector 31 mounted at the tip.

Referring to FIG. 1, a thermostat or temperature control means 23 is mounted to the steering-wheel main body 21. The thermostat 23 comprises a thermostat main body or temperature sensor 23a, a lead wire 23b derived from the main body 23a, and a connector 23c mounted to the lead wire 23b at a tip thereof. The thermostat main body 23a is accommodated in a concavity, not shown, formed in the underside of the core bar 7a of the spoke 7 of the steering-wheel main body 2 to conform to the shape of the main body 23a. The lead wire 23b is drawn to the side of the boss 6 along the spoke 7, and is connected to a harness, not shown, through the connector 23c. The thermostat 23 serves to measure the temperature of the steering wheel 1, base on which the supply of power to the heater 21 is intermittently carried out to control the steering-wheel temperature not to be out of a predetermined temperature range. Moreover, the temperature control means 23 may include a voltage control circuit, etc. to adjust the amount of generated heat.

As described above, the first embodiment shows heater 21 for covering the annular rim 5 of the vehicular steering wheel 1, and heater-equipped steering wheel 1. In the first embodiment, the heater 21 is formed like a net having side edges 26 disposed along the circumferential direction of the rim 5 and terminals 27a, 27b each arranged at a termination of the side edges 26 to intersect them. Moreover, the heater 21 is fixedly mounted to the rim 5 with the side edges 26 located at the inner periphery of the rim 5, i.e. it is not fixed on the surface of the rim 5 at the outer periphery B. Therefore, even when the heater 21 undergoes external force, this force does not concentratedly act on particular narrow area or spots of the heater wires 28, but is dispersedly applied on the heater 21 by its movement on the surface of the rim 5 through the net structure, preventing breaking of the heater wires 28.

Moreover, in the structure with the skin 22 for covering the rim 5 and the heater 21, since the side edges 26 of the heater 21 are fixed to the skin 22 at the position corresponding to the inner periphery A of the rim 5, i.e. the heater 21 is not restrained by the skin 22 at the outer periphery B of the rim 5, the skin 22 and the heater 21 can be elongated without being restrained each other. Therefore, even when the heater 21 undergoes external force, this force does not concentratedly act on particular narrow area or spots of the heater wires 28, but is dispersedly applied on the heater 21 by its movement on the surface of the rim 5 through the net structure, preventing breaking of the heater wires 28.

Specifically, since the skin 22 is elongated by about 20% during mounting to the rim 5, the center portion of the heater main body 25 of the heater 21, which is located at the outer periphery B of the rim 5, undergoes perceptible tension from the skin 22. In the first embodiment, the center portion of the heater main body 25 is arranged freely movably to protect the heater 21, resulting in easy mounting operation and reduced manufacturing cost. On the other hand, the side edges 26 of the heater main body 25 fixed to another member are not arranged movably, since they are located at the inner periphery A of the rim 5.

Moreover, when mounting the heater 21 to the rim 5, the heater 21 is integrally fixed to the skin 22 to form the annular tube-like member 55 having inner diameter equal to outer diameter of the rim 5, which is then mounted to the rim 5. This facilitates mounting operation including winding of the skin 22 and the heater 21 to the rim 5, leading to less complicated operation and manufacturing cost with reduced occurrence of breaking of the heater wires 28 during mounting operation.

Furthermore, since the net-structure heater main body 25 of the heater 21 in itself is deformed elastically, there is no need to fix the heater wires 28 by using an expensive adhesive tape with elasticity, allowing easy reduction in manufacturing cost compared with the structure using such adhesive tape.

Further, the heater 21 comprises circumferentially extensible net heater main body 25, and strings or elongation restraining means 32 arranged at the side edges 26 disposed along the circumferential direction of the heater main body 25 and for restraining elongation of the side edges 26. The side edges 26 having string 32 can restrain elongation of the heater main body 25 when applying tension to the heater 21, and provide to the heater 21 the characteristics of having a curved shape that facilitates its mounting to the outer surface of the rim 5. This results in easy winding of the heater 21 on the rim 5 and difficult occurrence of wrinkle and displacement, allowing enhancement not only in workability, but in appearance and quality.

Specifically, the heater 21 is of a rectangle with the side edges 26 as long sides, wherein the strings or elongation restraining means 32 are arranged along the side edges 26. This structure enables the heater 21 to easily be curved along the convex surface of the rim 5 with roughly circular section. Moreover, the presence of the strings 32 at the side edges 26 contributes to stabilization of the shape of the side edges 26, leading to enhanced workability and quality with restrained occurrence of extreme density dispersion of the heater wires 28 in a predetermined area.

Still further, the elongation restraining means or string 32 include a twine of polyester, nylon or the like, which is soft in itself, allowing protection of the heater wires 28. Though less extensible than the heater main body 25, the string 32 can elongate in some degree, providing easy and neat winding of the heater 21 on the rim 5. Moreover, the use of the elongation restraining means 32 having greater tensile strength than that of the heater main body 25 allows substantial construction of the edges of the heater 21.

Furthermore, the heater 21 is constructed such that the meshes of the heater wires 28 of the heater main body 25 are inclined with respect to the circumferential direction, i.e. they are disposed in the bias direction. Therefore, when mounting the heater 21 to the rim 5, the heater main body 25 can smoothly be elongated without providing tension to one or both of the radial direction and the longitudinal direction of the heater wires 28. This facilitates winding of the heater 21 on the rim 5 without any uneven arrangement of the heater wires 28, preventing breaking thereof. Moreover, this increases a difference in elongation between the heater main body 25 and the string or elongation restraining means 32, providing easy curvature of the heater 21.

Further, the rim 5 is covered with the heater 21, which is in turn covered with the skin 22, allowing protection of the heater 21. Moreover, heating of the skin 22 through heat generated by the heater 21 can provide more uniform surface temperature thereof. Moreover, concealing of the heater 21 allows achievement of the same appearance as that of typical steering wheels with heater 21 that is not enhanced in design particularly.

Still further, fixing of the edges 26 of the heater 21 to the skin 22 allows easy and accurate positioning of the heater 21 with respect to the skin 22, and restrained elongation of the skin 22 by means of the string or elongation restraining means 32. Then, mounting of the skin 22 to the rim 5 in a proper position allows proper positioning of the heater 21 with respect to the rim 5. Moreover, the skin 22 with elongation restrained by the strings 32 can be provided with the characteristics of inward curvature and easy deformation into a shape suitable for mounting along the outer surface of the rim 5. Moreover, the heater 21 can easily and surely be disposed avoiding the holes 50 or stitching portion of the skin 22, leading to prevention of an interference of a needle with the heater 21 and elimination of breaking of the heater wires 28.

Furthermore, the skin 22 is formed like a closed loop or annulus, and is laid on the rim 5 with the heater 21 placed inside. This facilitates mounting operation of the skin 22 to the rim 5, and provides uniform tension to the skin 22 to restrain occurrence of local stretch and wrinkle, allowing enhancement in winding appearance or product quality.

Further, the heater 21 is mounted to the skin 22 mainly through the side edges 26 located at the inner periphery A of the rim 5, and not fixed thereto through the cross-direction center located at the outer periphery B of the rim 5. Therefore, even when the heater 21 undergoes external force, this force does not concentratedly act on particular narrow area or spots of the heater wires 28, but is dispersedly applied on the heater 21 by its movement on the surface of the rim 5 through the net structure, preventing breaking of the heater wires 28. As described above, the first embodiment can achieve an enhancement in quality of the steering wheel 1 with reduced manufacturing cost.

In the first embodiment, the heater 21 is mounted to the skin 22 to form an assembly, which is then mounted to the steering-wheel main body 2. Optionally, after mounting the heater 21 to the steering-wheel main body 2, the skin 22 can be disposed on the heater 21 for concealment.

Figure 6:
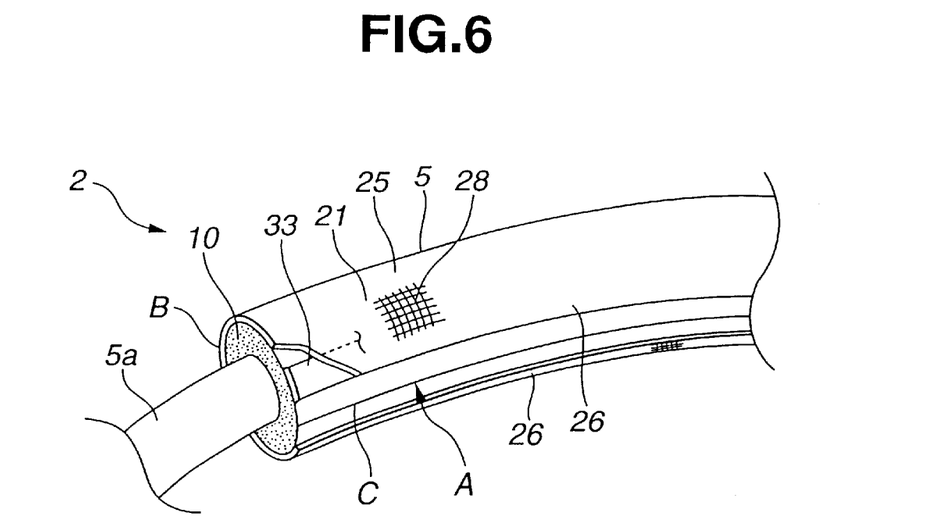
FIG. 6 is a fragmentary perspective view showing a second embodiment of the present invention.
Figure 7:
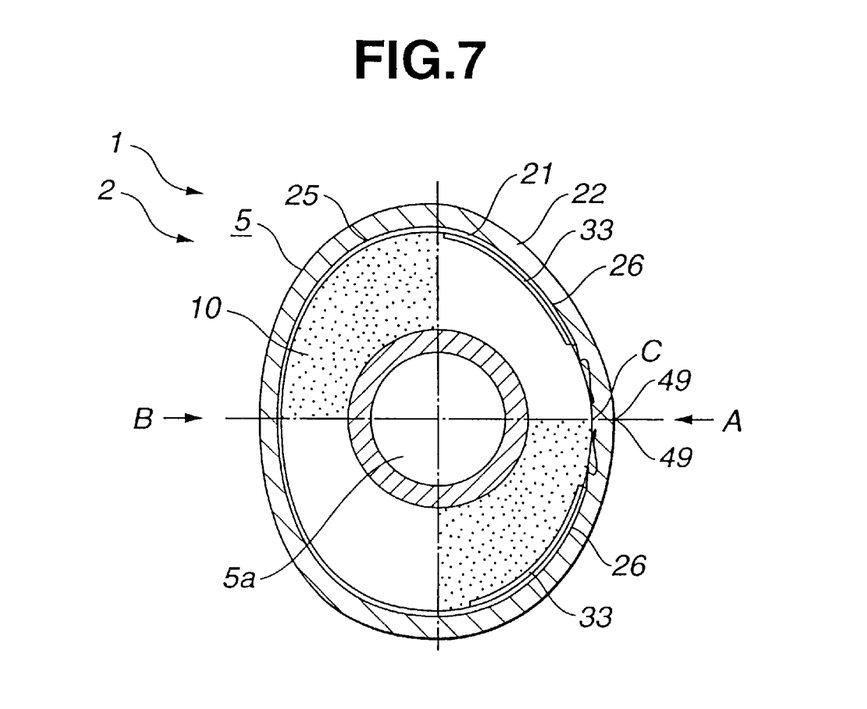
FIG. 7 is a cross sectional view showing a rim of the steering wheel.

By way of example, referring to FIGS. 6–7, as in the first embodiment, the inner covering 10 of polyurethane foam is arranged on all circumferential surface of the core bar 5a of the rim 5 of the steering-wheel main body 2. The inner covering 10 is covered with the heater 21 and the skin 22. A parting line C of a mold produced when forming the inner covering 10 is seen at the inner periphery A of the rim 5.

In the second embodiment, as in the first embodiment, the double-sided tape 33 for fixing the heater 21 is positioned in the vicinity of the inner periphery A of the rim 5. However, the double-sided tape 33 is not placed firstly on the heater 21 and the skin 22, but on the inner covering 10 of the rim 5. Specifically, firstly, a separator, not shown, is removed from one adhesive face of the double-sided tape 33 to have the adhesive face exposed, which is pressed and placed on the surface of the inner covering 10 in a predetermined position, e.g. a position along both sides of the inner periphery A. At that time, a separator remains disposed on another adhesive face of the double-sided tape 33.

Then, the heater 21 is wound on the rim 5. In the second embodiment, as in the first embodiment, the heater 21 comprises heater main body 25 obtained by weaving fine heater wires 28 formed like a net. The transverse center of the heater main body 25 is positioned at the outer periphery B of the rim 5 to fit the heater main body 25 on the inner covering 10 by means of self-restoring force. With the side edges 26 separated at the inner periphery A of the rim 5 to be opposite to each other, the remaining separator is removed from the double-sided tape 33 to place the side edges 26 thereon.

Subsequently, the skin 22 is wound on the heater 21 to form the steering wheel 1 as shown in FIG. 7. The skin 22 includes a closed-loop or annular tube-like member having inner diameter slightly smaller than outer diameter of the rim 5 as the tube-like member 55 shown in FIG. 1. For winding of the skin 22 on the rim 5, the tube-like member is enlarged in diameter to engage with the outer periphery B of the rim 5, then stitched at the inner periphery A of the rim 5.

In the second embodiment, the heater 21 is not fixed to the rim 5 at the outer periphery B wherein the skin 22 is pressed or rubbed on the inner covering 10 by strong force. Therefore, during winding operation of the skin 22, even when the skin 22 is rubbed against the heater 21, the movement of the heater 21 contributes to prevention of damage or breaking of the heater wires 28 and the net heater main body 25 in particular spots. This allows achievement of an intended heating performance of the heater 21 arranged in the steering-wheel main body 2, reading to enhanced yield. Moreover, the elongation of the skin 22 can be secured by a large amount, enabling easy winding of the skin 22 without any wrinkle, resulting in easy enhancement in product appearance. Moreover, winding of the skin 22 can be carried out as in the case with no heater 21, i.e. the steering wheel 1 can be assembled through ordinary operation as it were. As described above, the second embodiment can achieve an enhancement in quality of the steering wheel 1 with reduced manufacturing cost.

Figure 8A:
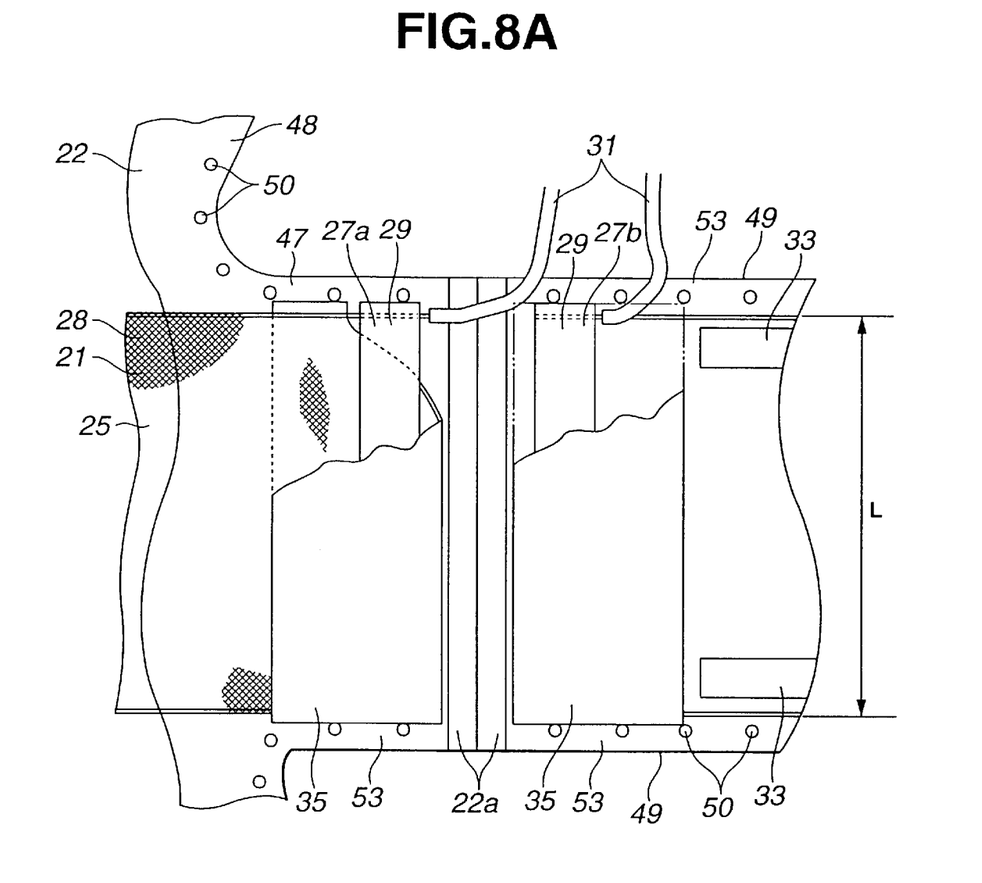
FIG. 8A is a partially cutaway fragmentary front view showing a third embodiment of the present invention.
Figure 8B:
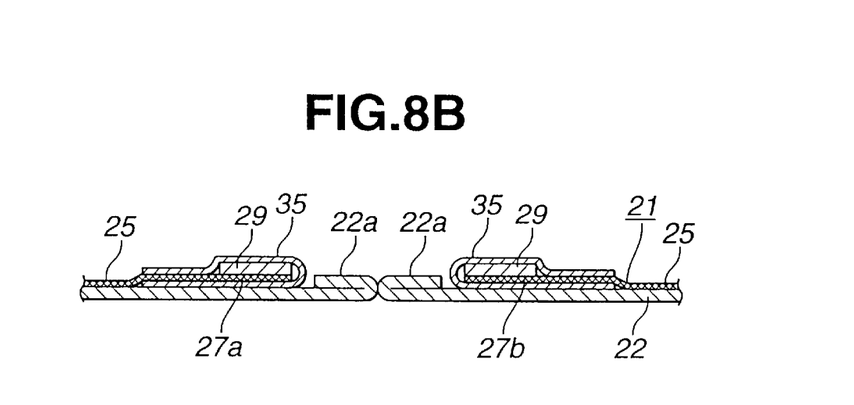
FIG. 8B is a fragmentary sectional view showing the heater in FIG. 8A.

Referring to FIGS. 8A–8B, in the third embodiment, a protective covering or protector 35 is disposed to conceal the terminal plate 29 of each terminal 27a, 27b of the heater main body 25 of the heater 21, and particular portions of the heater wires 28 connected to the terminal plate 29 and located in the vicinity of the terminal plate 29. The protective covering 35 is formed like roughly a sheet having a rectangular shape when deployed. The protective covering 35 is formed out of a deformable soft material, which is a nonwoven fabric of polyester fiber or the like in the third embodiment. The protective covering 35 is turned back at an end of the heater 21 to envelop in its entirety the terminal plate 29 and in part the heater main body 25 connected thereto. Moreover, a rubber adhesive or bonding means is placed on the protective covering 35 to have upper and lower opposite faces bonded each other through meshes of the heater main body 25.

Specifically, the heater 21 conceals the annular rim 5 of the steering wheel 1, and comprises heater main body 25 including side edges 26 disposed along the circumferential direction of the rim 5 and terminals 27a, 27b each arranged at a termination of the side edges 26 to intersect them, wherein the heater main body includes a net heating portion obtained by weaving a plurality of heater wires 28 interconnecting the terminals 27a, 27b. Each terminal 27a, 27b includes terminal plate or connection 29 for electrically mechanically connecting the heater wires 28 disposed in the above direction of intersection. The protective covering 35 is arranged to conceal the terminal plate 29 and part of the heater main body 25 adjacent thereto.

In the third embodiment, the protective covering 35 having intermediate characteristics between very large flexibility of the net heater main body 25 and small deformation follow-ability of the terminal plate 29 is disposed at a connection between the heater main body 25 and the terminal plate 29. Thus, the function of the characteristics of the protective covering 35 contributes to alleviation of stress concentration on the connection between the heater main body 25 and the terminal plate 29, i.e. stress dispersion, to protect the heater wires 28 of the heater main body 25, preventing breaking of the heater wires 28. This restrains damage of the heater 21 during assembling of the heater 21 to the steering-wheel main body 2, allowing preservation of excellent temperature-rise characteristics. Moreover, this facilitates handling of the heater 21 in the manufacturing process, allowing enhanced workability and reduced manufacturing cost.

Further, the protective covering 35 is disposed in layer between the heater 21 and the skin 22 for concealing the heater 21 and the rim 5 so as to support and protect the heater 21 together with the skin 22. This restrains breaking of the heater wires 28, allowing preservation of excellent temperature-rise characteristics. Moreover, this facilitates handling of the heater 21 in the manufacturing process, allowing enhanced workability and reduced manufacturing cost.

Furthermore, the protective covering 35 is formed out of an insulative material such as nonwoven fabric, achieving easy insulation of the terminal plates or feed portions 29 at ends of the heater 21 from other members.

In the third embodiment, the protective covering 35 includes a member different and distinct from the skin 22. Alternatively, the protective covering may be integrated or integrally formed with the skin. By way of example, referring to FIGS. 9A–9B, a protective covering 60 can be obtained by extending a turned-back portion 22a at a longitudinal end of the skin 22 up to the heater main body 2. Such integration of the protective covering 60 with the skin 22 allows a reduction in number of parts and manufacturing cost.

Figure 9A:
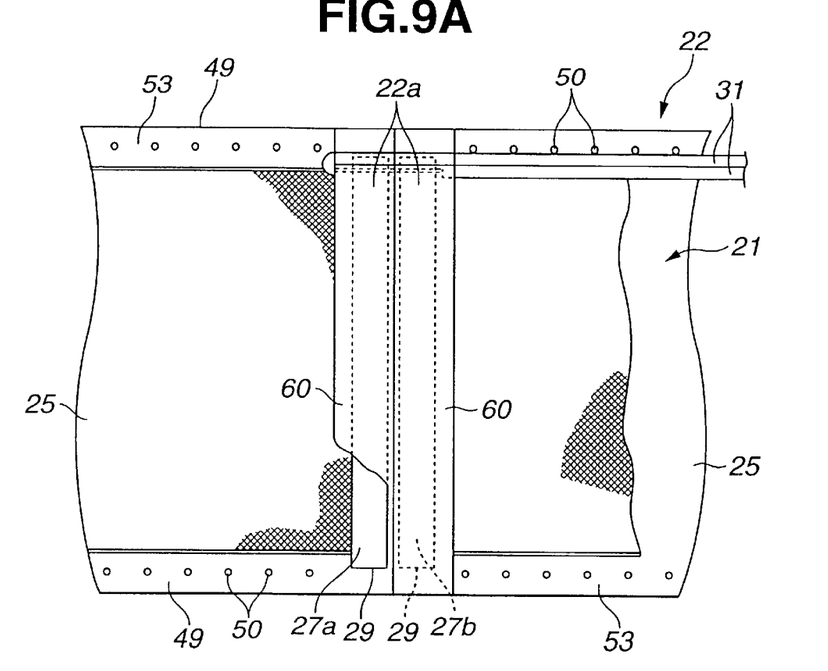
FIG. 9A is a view similar to FIG. 8A, showing a fourth embodiment of the present invention.
Figure 9B:
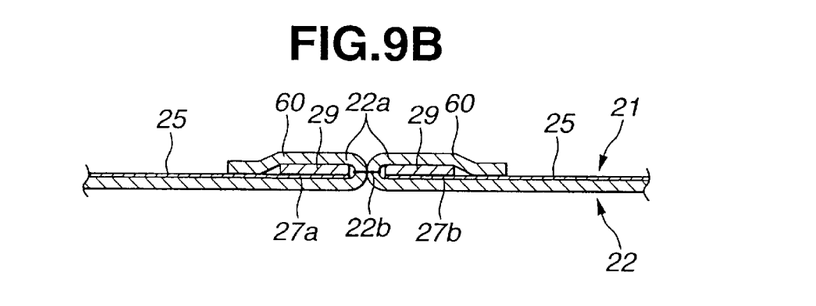
FIG. 9B is a view similar to FIG. 8B, showing the heater in FIG. 9A.

In the fourth embodiment as shown in FIGS. 9A–9B, the vicinity of each terminal 27a, 27b of the heater 21 is placed on the skin 22 along both edges 49 by means of a double-sided tape, an adhesive or the like. As in the first embodiment, the blank 53 is divided into two equal parts with respect to the aligned holes 50 as center line. Both ends of the skin 22 are sewed to each other with a thread 22b as shown in FIG. 9B.

Figure 10:
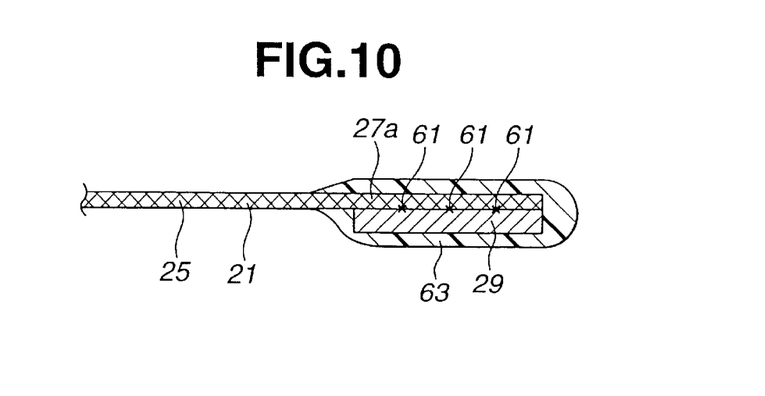
FIG. 10 is a view similar to FIG. 9B, showing a fifth embodiment of the present invention.

Optionally, the protective covering can be obtained out of resin in place of a sheet of cloth, leather or the like. By way of example, referring to FIG. 10, in the fifth embodiment, the terminal plate 29 is connected at least electrically to the heater wires 28 of the heater main body 25 by means of soldering or the like at predetermined spots 61, which is then immersed in liquid resin, obtaining a protective covering 63. Examples of preferable resins for forming the protective covering 63 are vinyl chloride and natural rubber.

In the illustrative embodiments, for enhanced workability, the longitudinal ends of the skin 22 are butted each other to form an annular or closed-loop member, which is then engaged with the rim 5. Optionally, after winding the band-like skin 22 on the rim 5 of the steering-wheel main body 2, the opposite ends of the skin 22 may be joined through sewing or the like.

Figure 11:
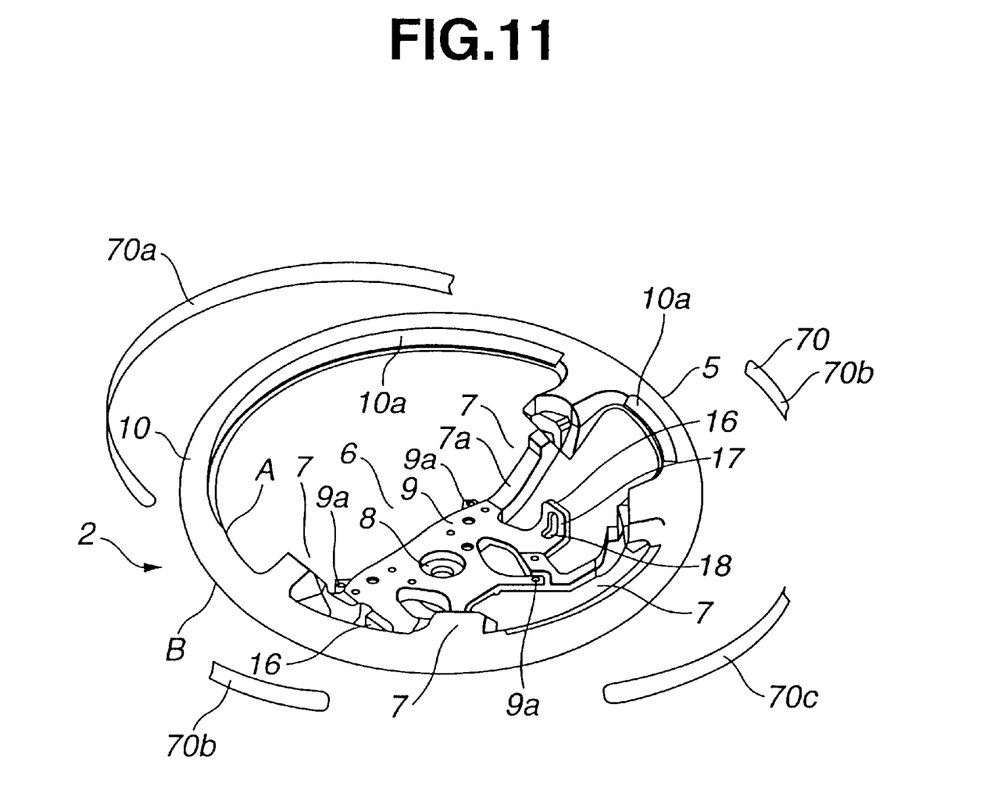
FIG. 11 is a view similar to FIG. 1, showing a sixth embodiment of the present invention.
Figure 12:
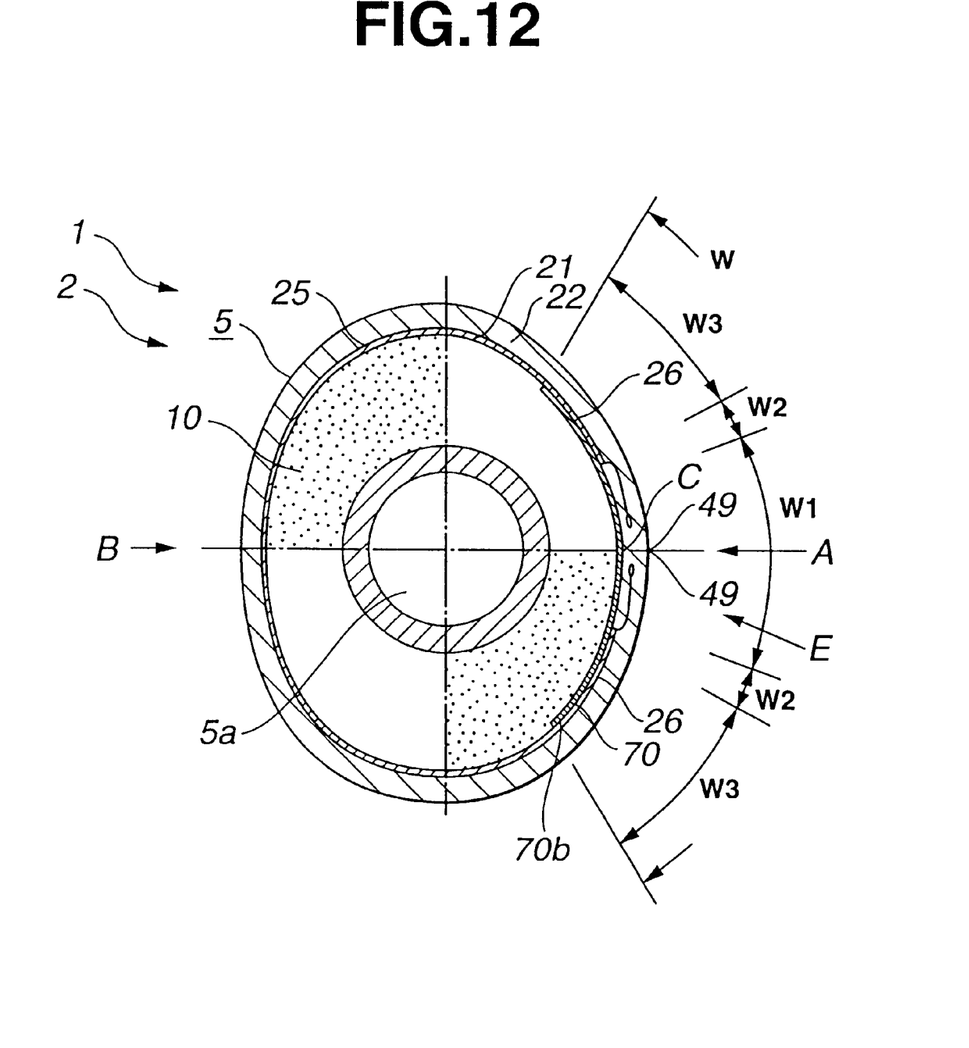
FIG. 12 is a view similar to FIG. 7, showing the rim in FIG. 11.

Referring to FIGS. 11–12, in the sixth embodiment, the steering-wheel main body 2 further comprises heat transfer means 70 including a plurality of metal plates or aluminum sheets 70a, 70b, 70b, 70c. Each aluminum sheet 70a, 70b, 70b, 70c is disposed at the inner periphery A of the rim 5 and between the spokes 7. The inner covering 10 is formed with recesses 10a having different widths, lengths and depths to receive the aluminum sheets 70a, 70b, 70b, 70c. When engaged with the recesses 10a, the aluminum sheets 70a, 70b, 70b, 70c have surfaces continuously connected to the surface of the inner covering 10, providing a roughly flat and single surface to the rim 5. In the sixth embodiment, the aluminum sheets 70a, 70b, 70b, 70c have 28 mm width W and 0.3 mm thickness, and are adhesively placed in the recesses 10a, respectively.

As described before, the skin 22 elongated at the outer periphery B of the rim 5 is inclined inwardly to wind the rim 5, and then disposed along the surface of the rim 5 to adhere thereto by means of the double-sided tapes for temporary fixing. In this state, as shown in FIG. 12, the side edges 26 of the heater 21 are disposed on both sides of the aluminum sheets 70a, 70b, 70b, 70c of the heat transfer means 70.

As shown in FIG. 12, the edges 49 of the skin 22 are butted each other on the inner periphery A of the rim 5 in a position C, and stitched with thread of polyester or the like which passes through the stitch holes. Stitches E are provided in a range W1 of about 8 mm in the circumferential direction of the section of the rim 5. The heater 21 is disposed at a distance of an additional space W2 of 2 mm away from the range W1 so as to avoid interference or contact of a needle with the heater 21 during stitching of the skin 22. The width of a superimposition W3 of each aluminum sheets 70a, 70b, 70b, 70c on the heater 21 is 8 mm.

When the heater 21 is energized through lead wires, the heater main body 25 provides heat except the rim 5 at the perimeter of the stitches E, achieving a temperature rise of the surface of the rim 5 through the skin 22. The portion of the rim 5 having stitches E is not directly heated by the heater main body 25. However, since both sides of the heater main body 25 are in contact with the superimposition W3 of the aluminum sheets 70a, 70b, 70b, 70c to warm the aluminum sheets, through which the skin 22 in the vicinity of the edges 49 is warmed. In such a way, the skin 22 is warmed in its entirety including a portion having stitches E in the vicinity of the edges 49.

As described above, the sixth embodiment shows heater 21 for covering the annular rim 5 of the vehicular steering wheel 1, wherein the heater 21 is arranged merely on part of the surface of the rim 5, and the heat transfer means 70 partly superimposed on the heater 21 is arranged on remaining part of the surface of the rim 5. Thus, heat generated by the heater 21 is promptly circumferentially transferred to the rim 5 through the heat transfer means 70, achieving substantially uniform heating of the rim 5 along all circumference of the section thereof, resulting in enhanced operation feel of the steering wheel 1. This structure allows the heater 21 not to extend exactly to the vicinity of the edges 49 of the skin 22.

In the sixth embodiment, the edges 49 of the skin 22 that conceals the rim 5, the heater 21 and the heat transfer means 70 are circumferentially disposed at the inner periphery A of the rim 5, and are butted each other for stitching. Since the heat transfer means 70 are disposed along the edges 49 of the skin 22, i.e. the heater 21 is not disposed along them, the portion of the skin 22 having stitches E, i.e. stitched portion of the edges 49, is not superimposed on the heater 21, but on the heat transfer means 70 only, preventing damage of the heater wires 28 of the heater 21 from a needle. Moreover, the heater 21 is arranged astride a butt portion of the edges 49 of the skin 22, providing sufficient heating of the portion of the skin 22 having stitches E.

Further, the heat transfer means 70 have both sides superimposed on the side edges 26 of the heater 21, receiving heat from two directions, resulting in achievement of effective heating.

Still further, the heat transfer means 70 include thin metal sheets with excellent heat conductivity such as aluminum sheets 70a, 70b, 70b, 70c, allowing easy achievement of the structure suitable for heating of the rim or grip 5.

In the sixth embodiment, the heat transfer means 70 are disposed on the rim 5, and the heater 21 is in turn disposed on the heat transfer means 70. Alternatively, the heat transfer means 70 may be disposed on the heater 21. Moreover, the heat transfer means 70 can be extended to the spokes to provide a heat-transfer effect to particular portions of the spokes in the vicinity of junctions with the rim 5.

Having described the present invention with regard to the preferred embodiments, it is noted that the present invention is not limited thereto, and various changes and modifications can be made without departing from the scope of the present invention.

The entire teachings of Japanese Patent Applications 2000-287360, 2000-289200, 2000-301025, and 2000-291315 are incorporated hereby by reference.

What is claimed is:

1. A heater for a steering wheel, comprising:
   a main body arranged on a rim of the steering wheel, the main body being formed like a net comprising a plurality of heater wires for generating heat upon energization; and
   side edges arranged along longitudinal edges of the main body, the side edges being fixed at an inner periphery of the rim.

2. The heater as claimed in claim 1, further comprising an elongation restraining device arranged along a circumferential direction of the rim, the elongation restraining device restraining longitudinal elongation of the main body.

3. The heater as claimed in claim 2, wherein the elongation restraining device includes a string.

4. The heater as claimed in claim 2, wherein the elongation restraining device is arranged along each side edge.

5. The heater as claimed in claim 1, wherein the heater wires are inclined with respect to a circumferential direction of the rim.

6. A steering wheel, comprising:
   a steering-wheel main body with a rim;
   a heater arranged on the rim; and
   a covering arranged on the heater,
   wherein the heater comprises a heater main body formed like a net, the heater main body comprising a plurality of heater wires for generating heat upon energization and side edges arranged along longitudinal edges of the heater main body and fixed to the covering at an inner periphery of the rim.

7. The steering wheel as claimed in claim 6, further comprising a feed portion connected to an end of the heater main body, and a protector disposed on the feed portion and the heater main body in the vicinity of the feed portion.

8. The steering wheel as claimed in claim 7, wherein the protector is formed out of a deformable material.

9. The steering wheel as claimed in claim 7, wherein the protector is disposed in layer between the heater and the covering.

10. The steering wheel as claimed in claim 7, wherein the protector is integrally formed with the covering.

11. The steering wheel as claimed in claim 8, wherein the deformable material includes cloth, leather, and resin.

12. The steering wheel as claimed in claim 6, further comprising a heat transfer device arranged between the rim and the covering, wherein the heat transfer device extends to a position facing a connection of the covering, and wherein the heat transfer device has both sides superimposed on the heater main body through the connection.

13. The steering wheel as claimed in claim 12, wherein the heat transfer device is greater in heat conductivity than the covering.

14. The steering wheel as claimed in claim 12, wherein the heat transfer device comprises a metal sheet.

15. The steering wheel as claimed in claim 6, further comprising a temperature control device mounted to the steering-wheel main body.

16. A method of manufacturing a heater-equipped steering wheel, comprising:
   placing a heater on a covering of the steering wheel at an inner periphery and along longitudinal edges of the covering;
   connecting ends of the covering to form a tube-like member;
   engaging the tube-like member with a rim of the steering wheel at an outer periphery of the rim; and
   connecting longitudinal edges of the tube-like member along the inner periphery of the rim.

17. The method as claimed in claim 16, wherein the heater comprises a heater main body formed like a net, the heater main body comprising a plurality of heater wires for generating heat upon energization and side edges arranged along longitudinal edges of the heater main body and fixed to the covering at the inner periphery of the rim.

\* \* \* \* \*